(12) United States Patent
Kondou et al.

(10) Patent No.: US 10,088,734 B2
(45) Date of Patent: Oct. 2, 2018

(54) WAVEGUIDE-TYPE OPTICAL ELEMENT (71) Applicant: Sumitomo Osaka Cement Co., Ltd, Tokyo (JP)

(72) Inventors: Katsutoshi Kondou, Tokyo (JP); Junichiro Ichikawa, Tokyo (JP); Toshio Kataoka, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/509,692

(22) PCT Filed: Mar. 9, 2016

(86) PCT No.: PCT/JP2016/057396
§ 371 (c)(1),
(2) Date: Mar. 8, 2017

(87) PCT Pub. No.: WO2016/152528
PCT Pub. Date: Sep. 29, 2016

(65) Prior Publication Data
US 2018/0120666 A1      May 3, 2018

(30) Foreign Application Priority Data

Mar. 25, 2015   (JP) .................................. 2015-062368

(51) Int. Cl.
*G02B 6/00*      (2006.01)
*G02F 1/225*     (2006.01)
(Continued)

(52) U.S. Cl.
CPC ............ *G02F 1/2257* (2013.01); *G02F 1/035* (2013.01); *H01P 3/003* (2013.01); *G02F 2001/212* (2013.01)

(58) Field of Classification Search
None
See application file for complete search history.

(56) References Cited

U.S. PATENT DOCUMENTS 5,563,965 A      10/1996   Madabushi
6,449,080 B1 *    9/2002   McBrien ............... G02F 1/2255
                                                        359/245
(Continued)

FOREIGN PATENT DOCUMENTS

JP            2606674 B2      5/1997
JP         2009145816 A      7/2009
(Continued)

OTHER PUBLICATIONS

International Search Report for PCT/JP2016/057396 dated Jun. 7, 2016.
(Continued)

*Primary Examiner* — Tina Wong
(74) *Attorney, Agent, or Firm* — Taft Stettinius & Hollister LLP (57) ABSTRACT

In a waveguide-type optical element, broaderband operation becomes possible. The waveguide-type optical element includes optical waveguides (110 and 112) formed on a substrate (100) having an electro-optic effect and a control electrode for controlling an optical wave that is transmitted through the optical waveguide, the control electrode comprises a central electrode (104) and ground electrodes (106 and 108), the central electrode being formed along the optical waveguide, and the ground electrodes being formed so as to put the central electrode therebetween in a surface direction of the substrate at a predetermined distance from the central electrode, and the central electrode or the ground electrodes have multiple pairs of facets, each comprising two facets facing each other, along a transmission direction of high-frequency signals that are transmitted through the central electrode and the ground electrodes.

23 Claims, 7 Drawing Sheets

(51) Int. Cl.
   *G02F 1/035* (2006.01)
   *H01P 3/00* (2006.01)
   *G02F 1/21* (2006.01)

(56) References Cited

U.S. PATENT DOCUMENTS

| | | | | |
|---|---|---|---|---|
| 6,473,547 | B2* | 10/2002 | Longone | G02F 1/0356 |
| | | | | 385/40 |
| 6,522,793 | B1* | 2/2003 | Szilagyi | G02F 1/225 |
| | | | | 385/1 |
| 6,583,917 | B2* | 6/2003 | Melloni | G02F 1/225 |
| | | | | 359/245 |
| 6,845,183 | B2* | 1/2005 | Cheung | G02F 1/0356 |
| | | | | 359/245 |
| 6,862,124 | B2* | 3/2005 | Akiyama | B82Y 20/00 |
| | | | | 359/237 |
| 6,993,212 | B2* | 1/2006 | Block | G02F 1/011 |
| | | | | 385/3 |
| 7,809,218 | B2* | 10/2010 | Iwata | G02F 1/0356 |
| | | | | 385/1 |
| 8,081,851 | B2* | 12/2011 | Koos | G02F 1/011 |
| | | | | 385/1 |
| 9,008,468 | B2* | 4/2015 | Huang | G02F 1/0356 |
| | | | | 385/3 |
| 9,116,413 | B2* | 8/2015 | Huang | G02F 1/225 |
| 9,140,955 | B2* | 9/2015 | Hoffmann | G02F 1/025 |
| 9,140,957 | B2* | 9/2015 | Velthaus | G02F 1/2255 |
| 9,310,663 | B2* | 4/2016 | Velthaus | G02F 1/2255 |
| 9,507,238 | B2* | 11/2016 | Khurgin | G02F 1/2257 |
| 9,746,741 | B2* | 8/2017 | Kataoka | G02F 1/0316 |
| 2002/0154842 | A1 | 10/2002 | Betts | |
| 2003/0219187 | A1 | 11/2003 | Shimotsu | |
| 2013/0170781 | A1* | 7/2013 | Kissa | G02F 1/035 |
| | | | | 385/3 |
| 2014/0079351 | A1* | 3/2014 | Macario | G02F 1/0356 |
| | | | | 385/3 |
| 2016/0033848 | A1 | 2/2016 | Kataoka et al. | |
| 2016/0109734 | A1* | 4/2016 | Porte | G02F 1/035 |
| | | | | 385/3 |
| 2018/0017839 | A1* | 1/2018 | Hosokawa | G02F 1/2255 |

FOREIGN PATENT DOCUMENTS

| | | |
|---|---|---|
| JP | 2010256502 A | 11/2010 |
| JP | 2014191095 A | 10/2014 |

OTHER PUBLICATIONS

Noguchi, K., "Lithium Niobate Modulators", Broadband Optical Modulators: Science, Technology, and Applications, CRC Press 2011, ed. by E. Chen and A. Murphy, Chapter 6, pp. 151-172.

Betty, I., "Indium Phosphide-Based Electro-Optic Modulators", Broadband Optical Modulators: Science, Technology, and Applications, CRC Press 2011, ed. by E. Chen and A. Murphy, Chapter 7, pp. 173-203, ISBN978-1-4398-2506-8.

Nagata, H., "Reliability of Lithium Niobate Modulators", Broadband Optical Modulators: Science, Technology, and Applications, CRC Press 2011, ed. by E. Chen and A. Murphy, Chapter 14, pp. 347-361, ISBN978-1-4398-2506-8.

Wooten, E., Kissa, K., Yi-Yan, A., Murphy, E., Lafaw, D., Hallemeierm P., Maack, D., Attanasio, D., Fritz, D., McBrien, G., Bossi., D., "A Review of Lithium Niobate Modulators for Fiber-Optic Communications Systems", IEEE Journal of Selected Topics in Quantum Electronics, Jan.-Feb. 2000, vol. 6, No. 1, pp. 69-82, ISBN978-1-4398-2506-8.

* cited by examiner

WAVEGUIDE-TYPE OPTICAL ELEMENT

TECHNICAL FIELD

The present invention relates to a waveguide-type optical element including an optical waveguide and a control electrode for controlling an optical wave that is transmitted through the optical waveguide, and particularly to a broadband waveguide-type optical element capable of acting in a broad frequency range.

BACKGROUND ART

In recent years, in the field of optical communication or optical measurement, waveguide-type optical elements such as optical modulators having an optical waveguide formed on a substrate having an electro-optic effect have been frequently used. Waveguide-type optical elements, generally, include the optical waveguide and a control electrode for controlling an optical wave that is transmitted through the optical waveguide.

As the above-described waveguide-type optical elements, for example, Mach-Zehnder-type optical modulators in which lithium niobate ($LiNbO_3$) (also referred to as "LN"), which is a ferroelectric crystal, is used for the substrate are widely used. Mach-Zehnder-type optical elements includes a Mach-Zehnder-type optical waveguide comprising an incident waveguide for introducing light from the outside, a branch portion for transmitting the light introduced using the incident waveguide to two separate paths, two parallel waveguides for transmitting the respective branched light rays at the rear end of the branch portion, and an emission waveguide for coupling the light rays that are transmitted through the two parallel waveguides and outputting the light rays to the outside.

In addition, Mach-Zehnder-type optical modulators include a control electrode for changing and controlling the phase of an optical wave that is transmitted through the parallel waveguides using an electro-optic effect when a voltage is applied. Generally, the control electrode is constituted as a coplanar waveguide (CPW)-type electrode having a central electrode formed in the upper portion of the parallel waveguides or near the parallel waveguides in the length direction of the parallel waveguide and a ground electrode disposed away from the central electrode.

Particularly, in the design of broadband (microwave band) Mach-Zehnder-type optical modulators for controlling an optical wave that is transmitted through the parallel waveguides at a higher frequency, it is necessary to balance the following (1) to (3).

(1) Velocity matching between the transmission velocity of light that is transmitted through the parallel waveguides and the transmission velocity of light that is transmitted through the central electrode (hereinafter, simply referred to as "velocity matching")

(2) Matching of the input impedance of the central electrode to the output impedance of the drive circuit (hereinafter, referred to as impedance matching)

(3) overlap of an optical wave and a microwave (modulation efficiency)

That is, in Mach-Zehnder-type optical modulators, as an essential condition for carrying out the velocity matching and the impedance matching, it is necessary to decrease the driving voltage as much as possible. Furthermore, in order to broaden the band, it also becomes necessary to reduce the loss of high-frequency signals (microwave loss) that are transmitted through electrodes. However, the decrease in the driving voltage and the broadening of the band has a conflicting relationship, and it is difficult to broaden the band without increasing the driving voltage.

In the related art, processing the surface of a substrate into a ridge shape and broadening the band while suppressing an increase in the driving voltage for achieving both the velocity matching and the impedance matching is known (Non Patent Literature No. 1).

In addition, in order to further broaden the band, a two-level constitution (that is, a constitution in which the thicknesses of these electrodes are changed to have two levels) is provided to the ground electrode and/or the central electrode, and thus the thicknesses of the electrodes at which the velocity matching is satisfied are increased without changing the impedance, thereby reducing the conductor loss of a microwave (Patent Literature No. 1).

In the above-described waveguide-type optical element of the related art, when the velocity matching is achieved using the substrate thickness, the electrode thicknesses, and the like, and the microwave loss is reduced, broadband action becomes possible to a certain extent. However, in actual cases, the upper limit of the thicknesses of electrodes that can be formed is approximately 50 μm, and there is a limitation in broadening the band by increasing the thicknesses of electrodes. That is, in the formation of electrodes, it is necessary to increase the thickness of a resist that is used for the patterning of the electrodes in accordance with the thicknesses of the electrodes to be formed. However, as the thickness of the resist increases, stress in the resist increases, the attaching force between the resist and the substrate decreases, and a possibility of the resist being peeled off in the middle of the formation of the electrode increases. In addition, the time taken to form the electrodes also increases in accordance with the thickness, and productivity degrades. Here, in a method for forming the electrodes, semi-additive in which a photoresist and electroplating are used is used as described in Non Patent Literature Nos. 1 and 2.

CITATION LIST

Patent Literature

[Patent Literature No. 1] Japanese Patent No. 2606674

Non Patent Literature

[Non Patent Literature No. 1] "Broadband Optical Modulators", ISBN978-1-4398-2506-8

[Non Patent Literature No. 2] "A review of lithium niobate modulators for fiber-optic communications systems", Selected Topics in Quantum Electronics, IEEE Journal of, 2000, Vol. 6. No. 1: pp 69-82

SUMMARY OF INVENTION

Technical Problem

Due to the above-described background, in waveguide-type optical elements, there is a demand for realizing a constitution for enabling a broaderband operation.

Solution to Problem

According to an aspect of the present invention, there is provided a waveguide-type optical element including an optical waveguide formed on a substrate having an electro-optic effect and a control electrode for controlling an optical wave that is transmitted through the optical waveguide, in which the control electrode comprises a central electrode and ground electrodes, the central electrode being formed along the optical waveguide, and the ground electrodes being formed so as to put the central electrode therebetween in a surface direction of the substrate at a predetermined distance from the central electrode, and the central electrode or the ground electrodes have multiple pairs of facets, each comprising two facets facing each other, along a transmission direction of high-frequency signals that are transmitted through the central electrode and the ground electrodes.

According to another aspect of the present invention, the multiple pairs of facets are formed periodically at predetermined intervals along the transmission direction of the high-frequency signal.

According to another aspect of the present invention, the ground electrode has a front portion that extends toward the central electrode along the central electrode, the front portion being thinner than other portions, and the multiple pairs of facets are formed in portions other than the facing portion having a thinner thickness.

According to another aspect of the present invention, the multiple pairs of facets are formed as rectangular slits that open in a direction opposite to the central electrode.

According to another aspect of the present invention, the multiple pairs of facets are formed as rectangular slits that open in a direction toward the central electrode.

According to another aspect of the present invention, the ground electrode has a front portion that extends toward the central electrode along a longitudinal direction of the central electrode, the front portion being thinner than other portions, and the multiple pairs of facets are formed in the front portion having a thinner thickness.

According to another aspect of the present invention, the multiple pairs of facets are formed as rectangular slits that open in a direction toward the central electrode.

According to another aspect of the present invention, the rectangular slit has a narrow slit portion in a region extending a predetermined distance in a direction away from the central electrode from an edge of the ground electrode close to the central electrode, the narrow portion having a narrower slit width than other slit portion outside the region.

According to another aspect of the present invention, the multiple pairs of facets are formed as rectangular holes provided on the top surface of the ground electrode.

According to another aspect of the present invention, the multiple pairs of facets are formed as slits provided on the top surface of the central electrode.

According to another aspect of the present invention, the substrate is made of lithium niobate, and a thickness of the front portion of the ground electrode which is formed to have a thinner thickness is 5 µm or less.

According to another aspect of the present invention, the substrate is made of lithium niobate, and a thickness of the substrate is 4 µm or less.

DESCRIPTION OF EMBODIMENTS

Hereinafter, embodiments of the present invention will be described with reference to the accompanying drawings. Embodiments described below are optical modulators comprising a Mach-Zehnder-type optical waveguide. However, a waveguide-type optical element according to the present invention is not limited thereto and can be generally applied to optical modulators which are operated using a control electrode comprising a CPW-type electrode and comprise Mach-Zehnder-type optical waveguides, directional coupler-type optical waveguides, Y branching-type optical waveguides, or other types of optical waveguides, optical switches, and waveguide-type optical elements having other functions.

(First Embodiment)

First, a first embodiment of the present invention will be described.

Figure 1:
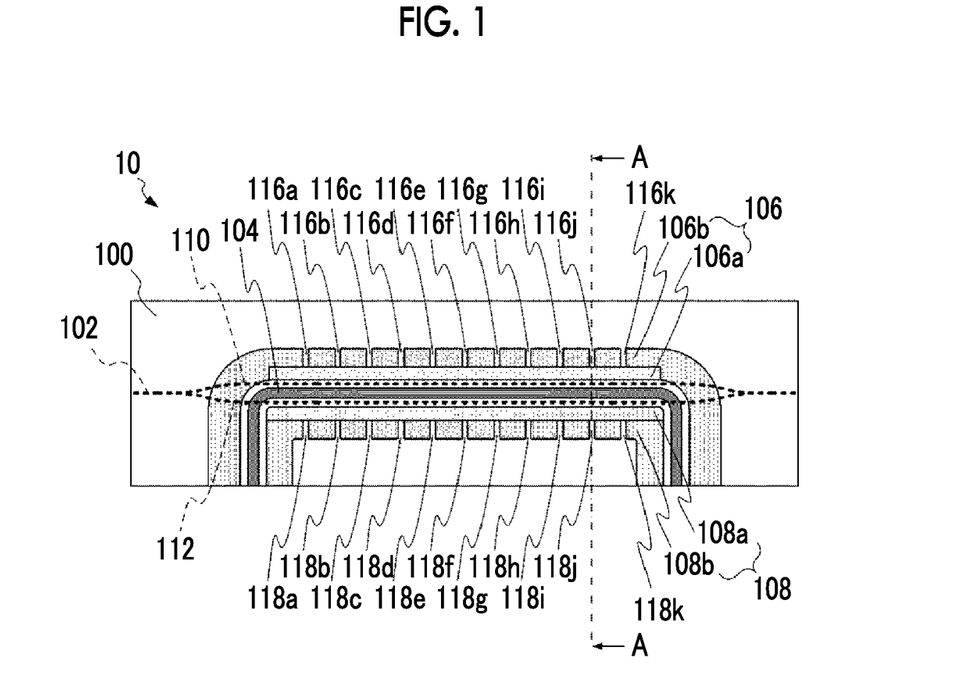
FIG. 1 is a view illustrating a constitution of a waveguide-type optical element according to a first embodiment of the present invention.

FIG. 1 is a view illustrating the constitution of a waveguide-type optical element according to the first embodiment of the present invention.

The present waveguide-type optical element 10 is a Mach-Zehnder-type optical modulator and has a Mach-Zehnder (MZ)-type optical waveguide 102 formed on a substrate 100 and a central electrode 104 and two ground electrodes 106 and 108 which constitute a CPW-type electrode.

The substrate 100 is a substrate made of lithium niobate (LN) which is an electro-optic material and is, for example, an X-cut LN substrate. The MZ-type optical waveguide 102 has parallel waveguides 110 and 112, and the central electrode 104 is formed parallel to the parallel waveguides 110 and 112 in a region on the surface of the substrate 100 which is surrounded by the parallel waveguides 110 and 112. In addition, the ground electrodes 106 and 108 are formed respectively at positions a predetermined distance away from the central electrode 104 on the sides of the parallel waveguides 110 and 112 opposite to the central electrode 104. The central electrode 104 and the ground electrodes 106 and 108 constitute control electrodes for controlling optical waves that are transmitted through the parallel waveguides 110 and 112. In more detail, the central electrode 104 and the ground electrode 106 constitute a control electrode for controlling an optical wave that is transmitted through the parallel waveguide 110, and the central electrode 104 and the ground electrode 108 constitute a control electrode for controlling an optical wave that is transmitted through the parallel waveguide 112.

A high-frequency signal is input from an end portion of the central electrode 104 on the lower left side in the drawing, is transmitted toward an end portion on the lower right side in the drawing, and is terminated by, for example, a terminal resistance (not illustrated) connected to the above-described end portion.

The ground electrode 106 comprises a portion facing the central electrode 104 along the central electrode 104 (hereinafter, the facing portion) 106a and a portion other than the facing portion (hereinafter, the back portion) 106b, and the facing portion 106a has a thinner thickness than the back portion 106b. Similarly, the ground electrode 108 comprises a portion facing the central electrode 104 along the central electrode 104 (hereinafter, the facing portion) 108a and a portion other than the facing portion (hereinafter, the back portion) 108b, and the facing portion 108a has a thinner thickness than the back portion 108b.

Particularly, in the present embodiment, slits 116a to 116k and 118a to 118k which are rectangular when seen in a planar view and open in a direction opposite to the central electrode 104 are provided along the transmission direction of the high-frequency signal (that is, the longitudinal direction of the central electrode 104 and the ground electrodes 106 and 108) in the back portion 106b of the ground electrode 106 and the back portion 108b of the ground electrode 108, respectively. Due to these rectangular slits 116a to 116k and 118a to 118k, multiple pairs of facets comprising two facets facing each other (that is, the surface of the electrode material of the corresponding ground electrode 106 or 108) are formed along the transmission direction of the high-frequency signal in the back portion 106b of the ground electrode 106 and the back portion 108b of the ground electrode 108, respectively.

Figure 2:
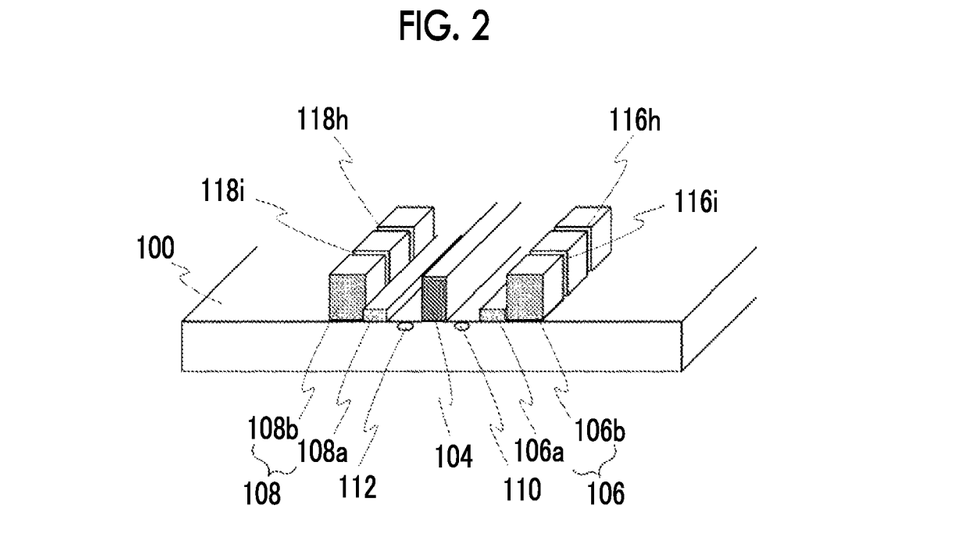
FIG. 2 is a perspective view of a cross-section taken in a direction of AA of the waveguide-type optical element illustrated in FIG. 1.

FIG. 2 is a perspective view of a cross-section taken in a direction of AA of the waveguide-type optical element 10 illustrated in FIG. 1 and illustrates a part of the top surface of the substrate 100 which is connected to the AA cross-section together with the AA cross-section. The ground electrodes 106 and 108 comprise the facing portions 106a and 108a facing the central electrode 104 along the central electrode 104 and the back portions 106b and 108b respectively, and the facing portions 106a and 108a have a thinner thickness than the back portions 106b and 108b. Therefore, the impedance between the central electrode 104 and the ground electrodes 106 and 108 is matched to the output impedance of a drive circuit (not illustrated) connected to the central electrode 104 and the ground electrodes 106 and 108. The facing portions 106a and 108a have a thickness of, for example, 5 μm or smaller in a case in which the impedance is matched to 30 to 50Ω. In addition, the slits 116h, 116i, 118h, and 118i are provided in the portions of the back portions 106b and 108b which are illustrated in the drawing.

In the waveguide-type optical element 10 having the above-described constitution, multiple pairs of facets comprising two facets facing each other are formed along the transmission direction of the high-frequency signals by the rectangular slits 116a to 116k and 118a to 118k provided in the back portion 106b of the ground electrode 106 and the back portion 108b of the ground electrode 108 respectively. These pairs of facets respectively function as capacitors. Therefore, an additional capacity component is added to the characteristic impedance of a distributed constant circuit comprising the central electrode 104 and the ground electrodes 106 and 108, and a resonance point is generated in the S21 characteristics of the circuit, whereby broadband operation becomes possible.

Figure 3:
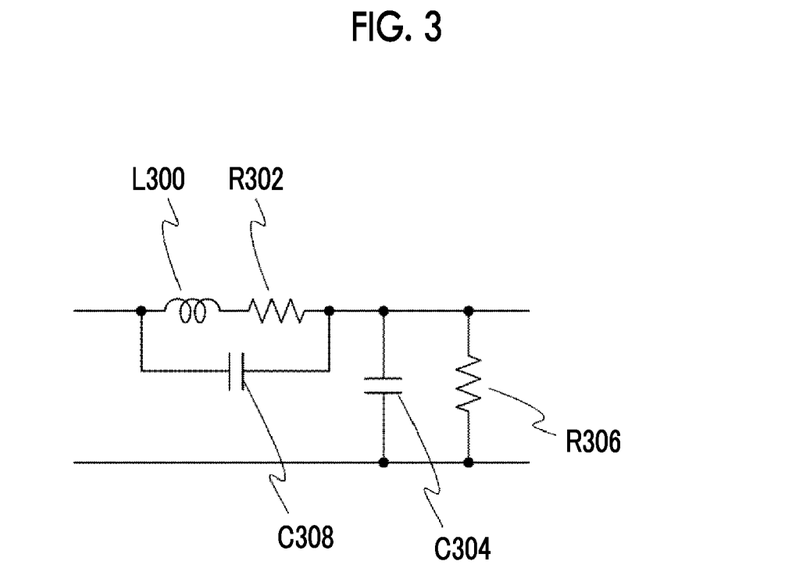
FIG. 3 is an equivalent circuit of a distributed constant circuit comprising a central electrode and ground electrodes in the waveguide-type optical element illustrated in FIG. 1.

FIG. 3 is an equivalent circuit of the distributed constant circuit comprising the central electrode 104 and the ground electrodes 106 and 108 in the waveguide-type optical element 10 illustrated in FIG. 1. L300 and R302 are respectively the impedance component and the direct-current resistance component of the central electrode 104 and the ground electrodes 106 and 108 in a case in which the slits 116a to 116k and 118a to 118k are not provided. C304 and R306 are respectively a capacitance component and an absolute resistance component between the central electrode 104 and the ground electrodes 106 and 108. In the waveguide-type optical element 10 of the present embodiment, since the slits 116a to 116k and 118a to 118k are provided, the two facing facets constituted by these slits function as capacitors, and an additional capacitance C308 is added to the ground electrodes 106 and 108 in parallel. Therefore, as described above, a resonance point is generated in the S21 characteristics of the distributed constant circuit comprising the central electrode 104 and the ground electrodes 106 and 108, and broadband operation becomes possible.

Meanwhile, the slits 116a to 116k and 118a to 118k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 μm or smaller in order to match the velocity between an optical wave and the high-frequency signal.

(Second Embodiment)

Next, a second embodiment of the present invention will be described.

Figure 4:
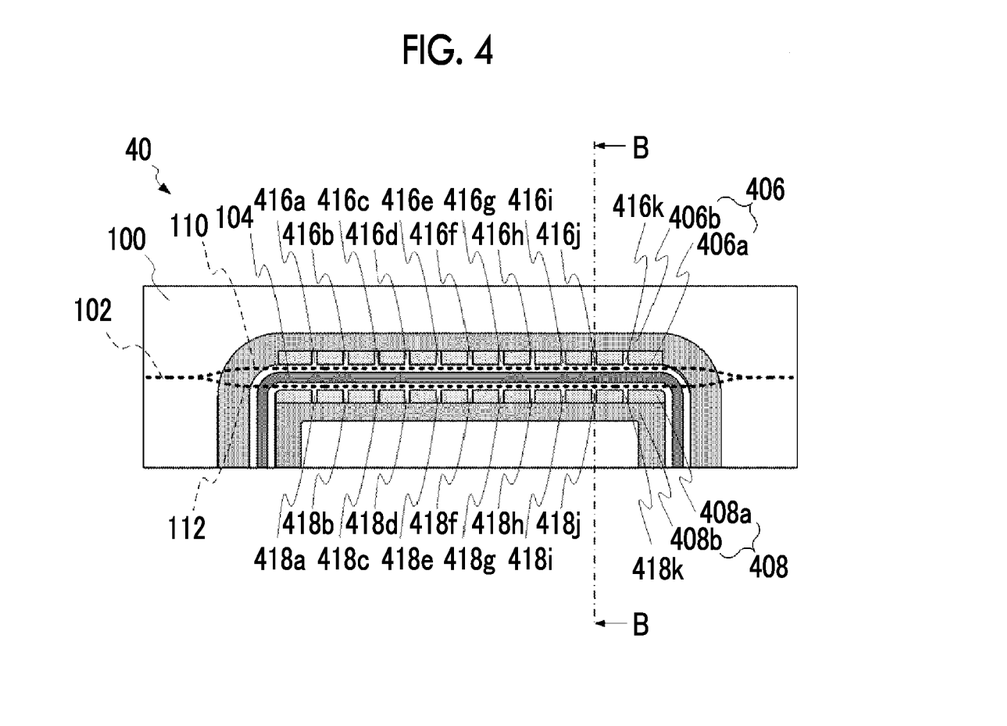
FIG. 4 is a view illustrating a constitution of a waveguide-type optical element according to a second embodiment of the present invention.

FIG. 4 is a view illustrating the constitution of a waveguide-type optical element according to the second embodiment of the present invention. Meanwhile, in FIGS. 4 and 5, the same constituent elements as those in the waveguide-type optical element 10 according to the first embodiment illustrated in FIGS. 1 and 2 will be given the same reference number as in FIGS. 1 and 2, and the description thereof in the above-described waveguide-type optical element 10 according to the first embodiment will be applied to the present embodiment.

The present waveguide-type optical element 40 has the same constitution as that of the waveguide-type optical element 10 according to the first embodiment, but includes ground electrodes 406 and 408 instead of the ground electrodes 106 and 108. The ground electrodes 406 and 408 have the same constitution as that of the ground electrodes 106 and 108 except for the fact that facing portions 406a and 408a and back portions 406b and 408b are provided instead of the facing portions 106a and 108a and the back portions 106b and 108b. The facing portions 406a and 408a and the back portions 406b and 408b have the same constitution as that of the facing portions 106a and 108a and the back portions 106b and 108b. However, no slits are provided in the back portions 406b and 408b. Slits 416a to 416k and 418a to 418k which are rectangular when seen in a planar view and open in a direction toward the central electrode 104 are provided along the transmission direction of the high-frequency signal (that is, the longitudinal direction of the central electrode 104 and the ground electrodes 406 and 408) in the facing portions 406a and 408a, respectively.

Due to these rectangular slits 416a to 416k and 418a to 418k, multiple pairs of facets comprising two facets facing each other (that is, the surface of the electrode material of the corresponding ground electrode 406 or 408) are formed along the transmission direction of the high-frequency signal in the facing portion 406a of the ground electrode 406 and the facing portion 408a of the ground electrode 408, respectively.

Figure 5:
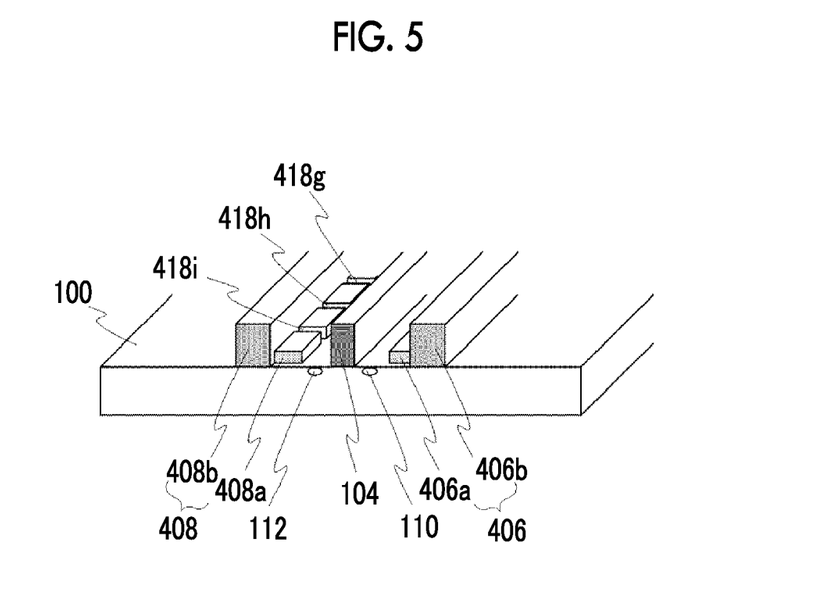
FIG. 5 is a perspective view of a cross-section taken in a direction of BB of the waveguide-type optical element illustrated in FIG. 5.

FIG. 5 is a perspective view of a cross-section taken in a direction of BB of the waveguide-type optical element 40 illustrated in FIG. 4 and illustrates a part of the top surface of the substrate 100 which is connected to the BB cross-section together with the BB cross-section. The ground electrodes 406 and 408 comprise the facing portions 406a and 408a facing the central electrode 104 along the central electrode 104 and the back portions 406b and 408b respectively. The facing portions 406a and 408a have a thinner thickness than the back portions 406b and 408b. Therefore, the impedance between the central electrode 104 and the ground electrodes 406 and 408 is matched to the output impedance of a drive circuit (not illustrated) connected to the central electrode 104 and the ground electrodes 406 and 408. The facing portions 406a and 408a have a thickness of, for example, 5 μm or smaller in a case in which the impedance is matched to 30 to 50Ω. In addition, the slits 418g, 418h, and 418i are provided in the portion of the facing portion 408a which is illustrated in the drawing.

In the waveguide-type optical element 40 having the above-described constitution, multiple pairs of facets comprising two facets facing each other are formed along the transmission direction of the high-frequency signals by the rectangular slits 416a to 416k and 418a to 418k provided in the facing portion 406a of the ground electrode 406 and the facing portion 408a of the ground electrode 408 respectively. These pairs of facets respectively function as capacitors. Therefore, similar to the waveguide-type optical element 10 according to the first embodiment, an additional capacity component is added to the characteristic impedance of a distributed constant circuit comprising the central electrode 104 and the ground electrodes 406 and 408. Furthermore, a resonance point is generated in the S21 characteristics of the circuit, and broadband operation becomes possible.

Meanwhile, the slits 416a to 416k and 418a to 418k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 μm or smaller in order to match the velocity between an optical wave and the high-frequency signal.

(Third Embodiment)

Next, a third embodiment of the present invention will be described.

Figure 6:
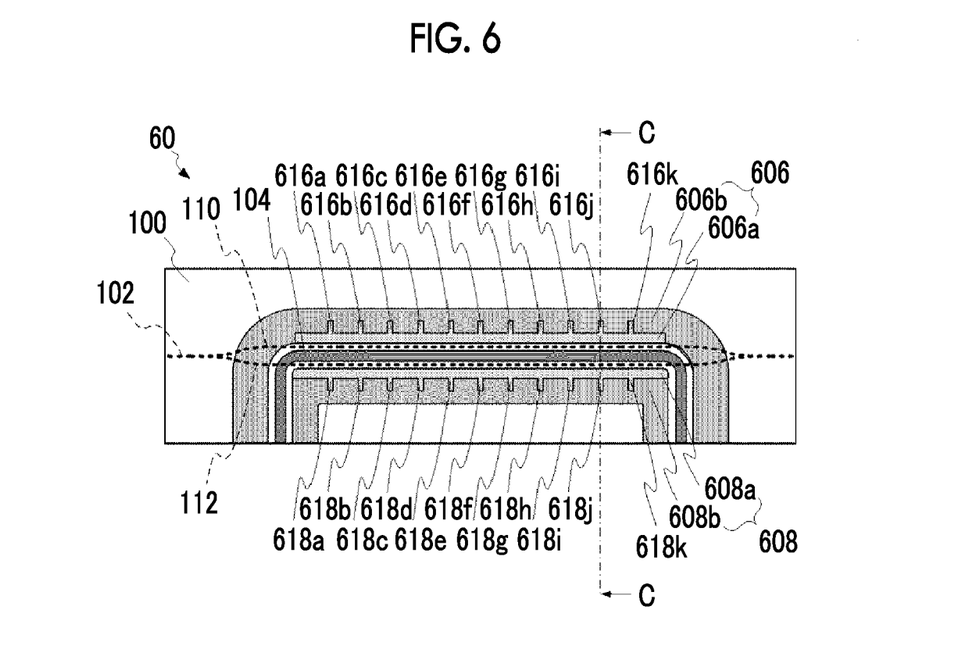
FIG. 6 is a view illustrating a constitution of a waveguide-type optical element according to a third embodiment of the present invention.

FIG. 6 is a view illustrating the constitution of a waveguide-type optical element according to the third embodiment of the present invention. Meanwhile, in FIGS. 6 and 7, the same constituent elements as those in the waveguide-type optical element 10 according to the first embodiment illustrated in FIGS. 1 and 2 will be given the same reference number as in FIGS. 1 and 2, and the description thereof in the above-described waveguide-type optical element 10 according to the first embodiment will be applied to the present embodiment.

The present waveguide-type optical element 60 has the same constitution as that of the waveguide-type optical element 10 according to the first embodiment, but includes ground electrodes 606 and 608 instead of the ground electrodes 106 and 108. The ground electrodes 606 and 608 have the same constitution as that of the ground electrodes 106 and 108. However, a difference is that facing portions 606a and 608a and back portions 606b and 608b are provided instead of the facing portions 106a and 108a and the back portions 106b and 108b. The facing portions 606a and 608a and the back portions 606b and 608b have the same constitution as that of the facing portions 106a and 108a and the back portions 106b and 108b. However, slits 616a to 616k and 618a to 618k which are rectangular when seen in a planar view and open in a direction toward the central electrode 104 are provided along the transmission direction of the high-frequency signal (that is, the longitudinal direction of the central electrode 104 and the ground electrodes 606 and 608) in the back portions 606b and 608b, respectively.

Due to these rectangular slits 616a to 616k and 618a to 618k, multiple pairs of facets comprising two facets facing each other (that is, the surface of the electrode material of the corresponding ground electrode 606 or 608) are formed along the transmission direction of the high-frequency signal in the back portion 606b of the ground electrode 606 and the back portion 608b of the ground electrode 608, respectively.

Figure 7:
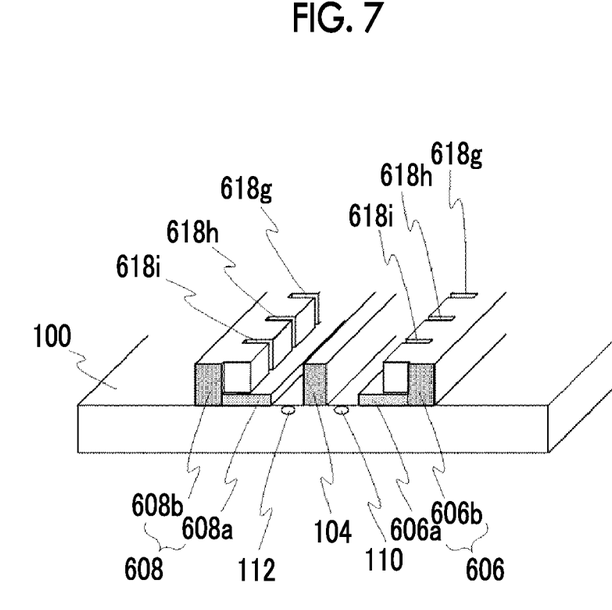
FIG. 7 is a perspective view of a cross-section taken in a direction of CC of the waveguide-type optical element illustrated in FIG. 6.

FIG. 7 is a perspective view of a cross-section taken in a direction of CC of the waveguide-type optical element 60 illustrated in FIG. 6 and illustrates a part of the top surface of the substrate 100 which is connected to the CC cross-section together with the CC cross-section. The ground electrodes 606 and 608 comprise the facing portions 606a and 608a facing the central electrode 104 along the central electrode 104 and the back portions 606b and 608b respectively, and the facing portions 606a and 608a have a thinner thickness than the back portions 606b and 608b. Therefore, the impedance between the central electrode 104 and the ground electrodes 606 and 608 is matched to the output impedance of a drive circuit (not illustrated) connected to the central electrode 104 and the ground electrodes 606 and 608. The facing portions 606a and 608a have a thickness of, for example, 5 μm or smaller in a case in which the impedance is matched to 30 to 50Ω. In addition, the slits 616g, 616h, 616i, 618g, 618h, and 618i are provided in the portions of the back portions 606b and 608b which are illustrated in the drawing.

In the waveguide-type optical element 60 having the above-described constitution, multiple pairs of facets comprising two facets facing each other are formed by the rectangular slits 616a to 616k and 618a to 618k provided in the back portion 606b of the ground electrode 606 and the back portion 608b of the ground electrode 608 respectively. In addition, these pairs of facets respectively function as capacitors. Therefore, similar to the waveguide-type optical element 10 according to the first embodiment, an additional capacity component is added to the characteristic impedance of a distributed constant circuit comprising the central electrode 104 and the ground electrodes 606 and 608. As a result, a resonance point is generated in the S21 characteristics of the circuit, and broadband operation becomes possible.

Meanwhile, the slits 616a to 616k and 618a to 618k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 µm or smaller in order to match the velocity between an optical wave and the high-frequency signal.

(Fourth Embodiment)

Next, a fourth embodiment of the present invention will be described.

Figure 8:
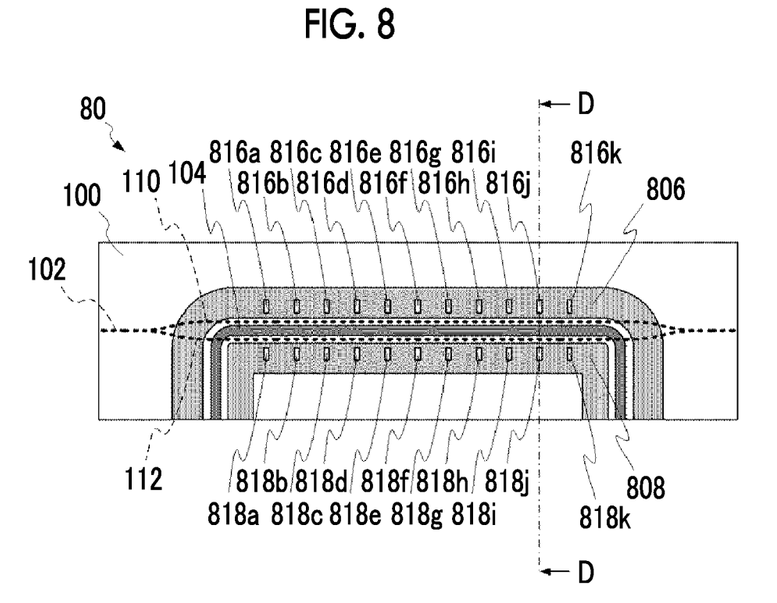
FIG. 8 is a view illustrating a constitution of a waveguide-type optical element according to a fourth embodiment of the present invention.

FIG. 8 is a view illustrating the constitution of a waveguide-type optical element according to the fourth embodiment of the present invention. Meanwhile, in FIGS. 8 and 9, the same constituent elements as those in the waveguide-type optical element 10 according to the first embodiment illustrated in FIGS. 1 and 2 will be given the same reference number as in FIGS. 1 and 2, and the description thereof in the above-described waveguide-type optical element 10 according to the first embodiment will be applied to the present embodiment.

The present waveguide-type optical element 80 has the same constitution as that of the waveguide-type optical element 10 according to the first embodiment, but includes ground electrodes 806 and 808 having a certain uniform thickness instead of the ground electrodes 106 and 108. The ground electrodes 806 and 808 are provided with rectangular trenches 816a to 816k and 818a to 818k in the depth direction (thickness direction) of the ground electrodes 806 and 808 along the transmission direction of the high-frequency signal (that is, the longitudinal direction of the central electrode 104 and the ground electrodes 806 and 808) in the ground electrodes 806 and 808, respectively.

Due to these rectangular trenches 816a to 816k and 818a to 818k, multiple pairs of facets comprising two facets facing each other (that is, the surface of the electrode material of the corresponding ground electrode 806 or 808) are formed along the transmission direction of the high-frequency signal in the ground electrodes 806 and 808, respectively.

Figure 9:
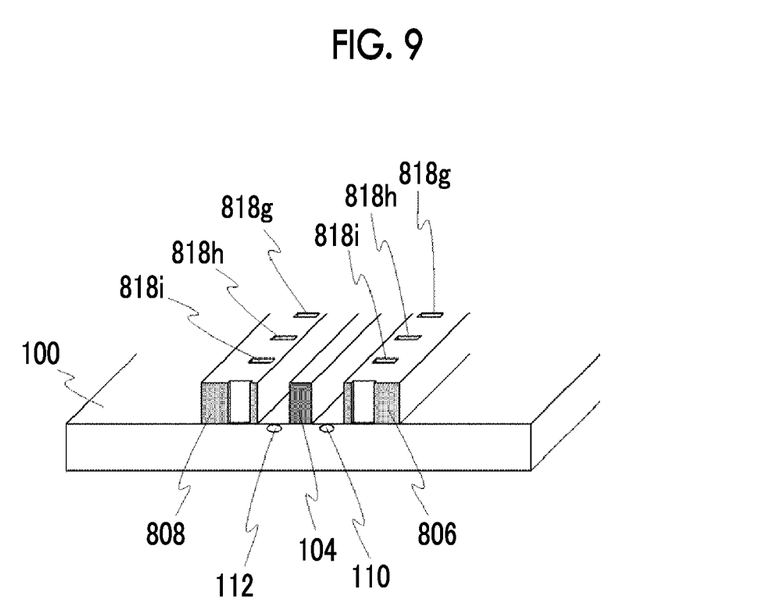
FIG. 9 is a perspective view of a cross-section taken in a direction of DD of the waveguide-type optical element illustrated in FIG. 8.

FIG. 9 is a perspective view of a cross-section taken in a direction of DD of the waveguide-type optical element 80 illustrated in FIG. 8. FIG. 9 illustrates a part of the top surface of the substrate 100 which is connected to the DD cross-section together with the DD cross-section. The trenches 816g, 816h, 816i, 818g, 818h, and 818i are provided in the portions of the ground electrodes 806 and 808 which are illustrated in the drawing.

In the waveguide-type optical element 80 having the above-described constitution, multiple pairs of facets comprising two facets facing each other are formed by the rectangular trenches 816a to 816k and 818a to 818k provided in the ground electrodes 806 and 808 respectively along the transmission direction of the high-frequency signal. These pairs of facets respectively function as capacitors. Therefore, similar to the waveguide-type optical element 10 according to the first embodiment, an additional capacity component is added to the characteristic impedance of a distributed constant circuit comprising the central electrode 104 and the ground electrodes 806 and 808. As a result, a resonance point is generated in the S21 characteristics of the circuit, and broadband operation becomes possible.

Meanwhile, the trenches 816a to 816k and 818a to 818k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 µm or smaller in order to match the velocity between an optical wave and the high-frequency signal.

(Fifth Embodiment)

Next, a fifth embodiment of the present invention will be described.

Figure 10:
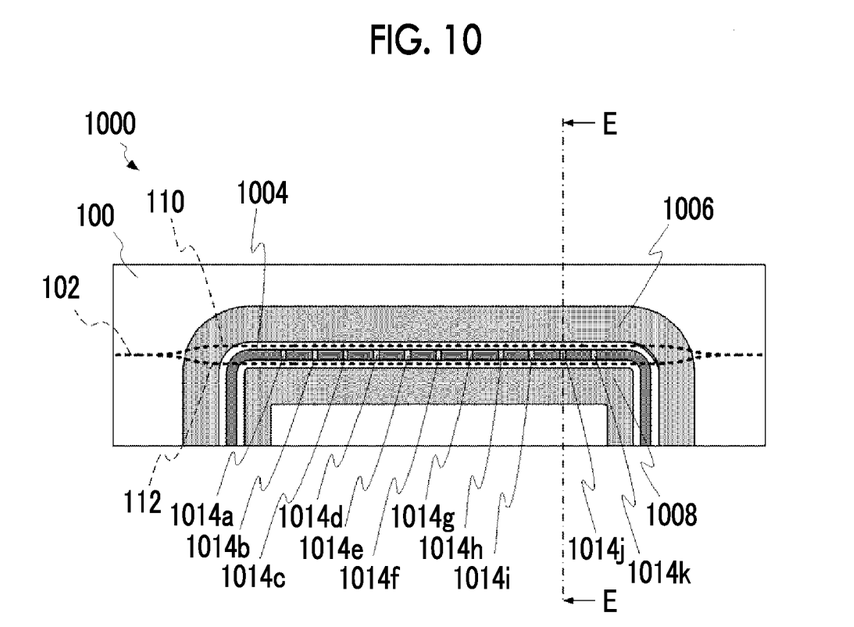
FIG. 10 is a view illustrating a constitution of a waveguide-type optical element according to a fifth embodiment of the present invention.

FIG. 10 is a view illustrating the constitution of a waveguide-type optical element according to the fifth embodiment of the present invention. Meanwhile, in FIGS. 10 and 11, the same constituent elements as those in the waveguide-type optical element 10 according to the first embodiment illustrated in FIGS. 1 and 2 will be given the same reference number as in FIGS. 1 and 2, and the description thereof in the above-described waveguide-type optical element 10 according to the first embodiment will be applied to the present embodiment.

The present waveguide-type optical element 1000 has the same constitution as that of the waveguide-type optical element 10 according to the first embodiment, but includes ground electrodes 1006 and 1008 having a certain uniform thickness instead of the ground electrodes 106 and 108 and includes a central electrode 1004 instead of the central electrode 104. The central electrode 1004 is provided with rectangular slits 1014a to 1014k that open upwards from the central electrode 1004 (the direction away from the substrate 100, that is, the direction coming from FIG. 10) along the transmission direction of the high-frequency signal (that is, the longitudinal direction of the central electrode 1004 and the ground electrodes 1006 and 1008).

Due to these rectangular slits 1014a to 1014k, multiple pairs of facets comprising two facets facing each other (that is, the surface of the electrode material of the central electrode 1004) are formed along the transmission direction of the high-frequency signal in the central electrode 1004.

Figure 11:
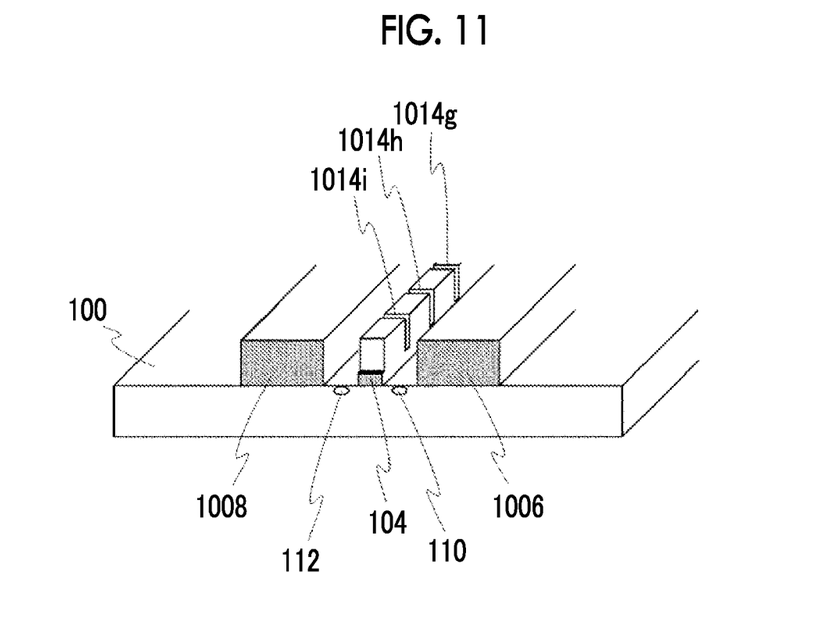
FIG. 11 is a perspective view of a cross-section taken in a direction of EE of the waveguide-type optical element illustrated in FIG. 10.

FIG. 11 is a perspective view of a cross-section taken in a direction of EE of the waveguide-type optical element 1000 illustrated in FIG. 10 and illustrates a part of the top surface of the substrate 100 which is connected to the EE cross-section together with the EE cross-section. The ground electrodes 1006 and 1008 and the central electrode 1004 which have a certain uniform thickness are provided, and the slits 1014g, 1014h, and 1014i are provided in the portion of the central electrode 1004.

In the waveguide-type optical element 1000 having the above-described constitution, multiple pairs of facets comprising two facets facing each other are formed by the rectangular slits 1014a to 1014k provided in the central electrode 1004 along the transmission direction of the high-frequency signal. These pairs of facets respectively function as capacitors. Therefore, similar to the waveguide-type optical element 10 according to the first embodiment, an additional capacity component is added to the characteristic impedance of a distributed constant circuit comprising the central electrode 1004 and the ground electrodes 1006 and 1008, and a resonance point is generated in the S21 characteristics of the circuit, whereby broadband operation becomes possible.

Meanwhile, the slits 1014a to 1014k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 µm or smaller in order to match the velocity between an optical wave and the high-frequency signal.

(Sixth Embodiment)

Next, a sixth embodiment of the present invention will be described.

Figure 12:
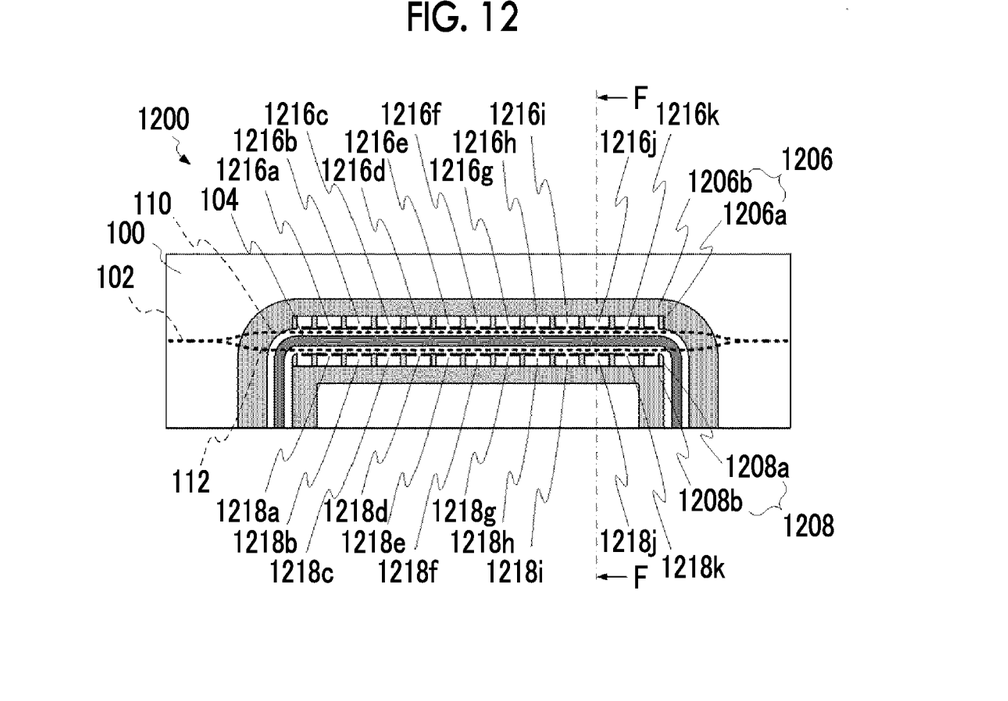
FIG. 12 is a view illustrating a constitution of a waveguide-type optical element according to a sixth embodiment of the present invention.

FIG. 12 is a view illustrating the constitution of a waveguide-type optical element according to the sixth embodiment of the present invention. Meanwhile, in FIGS. 12 and 13, the same constituent elements as those in the waveguide-type optical element 10 according to the first embodiment illustrated in FIGS. 1 and 2 will be given the same reference number as in FIGS. 1 and 2, and the description thereof in the above-described waveguide-type optical element 10 according to the first embodiment will be applied to the present embodiment.

The present waveguide-type optical element 1200 has the same constitution as that of the waveguide-type optical element 10 according to the first embodiment, but includes ground electrodes 1206 and 1208 instead of the ground electrodes 106 and 108.

The ground electrodes 1206 and 1208 have the same constitution as that of the ground electrodes 106 and 108 except for the fact that facing portions 1206a and 1208a and back portions 1206b and 1208b are provided instead of the facing portions 106a and 108a and the back portions 106b and 108b. The facing portions 1206a and 1208a and the back portions 1206b and 1208b have the same constitution as that of the facing portions 106a and 108a and the back portions 106b and 108b. However, no slits are provided in the back portions 1206b and 1208b, and slits 1216a to 1216k and 1218a to 1218k that open in a direction toward the central electrode 104 are provided along the transmission direction of the high-frequency signal (that is, the longitudinal direction of the central electrode 104 and the ground electrodes 1206 and 1208) in the facing portions 1206a and 1208a, respectively.

In addition, the slits 1216a to 1216k and 1218a to 1218k have a narrow slit portion in an opening portion in a region extending a predetermined distance in a direction away from the central electrode 104 from the edges of the facing portions 1206a and 1208a of the ground electrodes 1206 and 1208 close to the central electrode 104, the narrow slit portion having a narrower slit width than other slit portions outside the region.

Due to these rectangular slits 1216a to 1216k and 1218a to 1218k, multiple pairs of facets comprising two facets facing each other (that is, the surface of the electrode material of the corresponding ground electrode 1206 or 1208) are formed along the transmission direction of the high-frequency signal in the facing portion 1206a of the ground electrode 406 and the facing portion 1208a of the ground electrode 1208, respectively.

Figure 13:
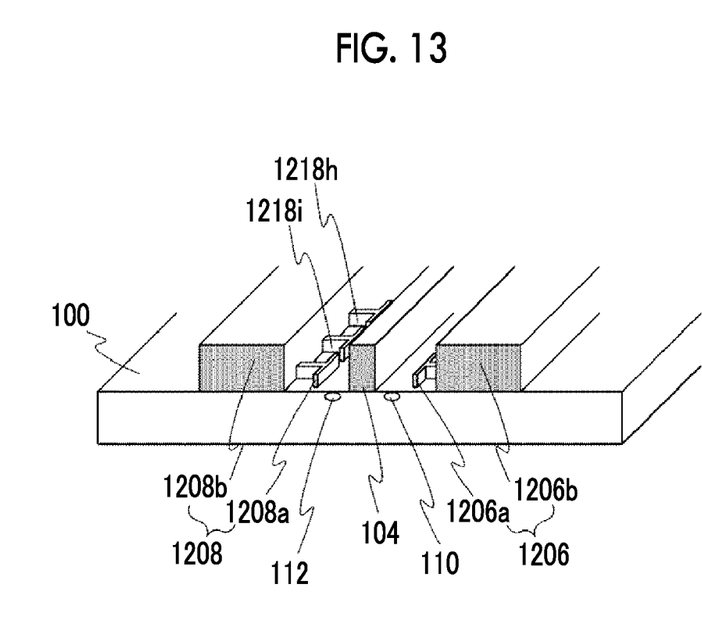
FIG. 13 is a perspective view of a cross-section taken in a direction of FF of the waveguide-type optical element illustrated in FIG. 12.

FIG. 13 is a perspective view of a cross-section taken in a direction of FF of the waveguide-type optical element 1200 illustrated in FIG. 12 and illustrates a part of the top surface of the substrate 100 which is connected to the FF cross-section together with the FF cross-section. The ground electrodes 1206 and 1208 comprise the facing portions 1206a and 1208a facing the central electrode 104 along the central electrode 104 and the back portions 1206b and 1208b respectively. The facing portions 1206a and 1208a have a thinner thickness than the back portions 1206b and 1208b. Therefore, the impedance between the central electrode 104 and the ground electrodes 1206 and 1208 is matched to the output impedance of a drive circuit (not illustrated) connected to the central electrode 104 and the ground electrodes 1206 and 1208. The facing portions 1206a and 1208a have a thickness of, for example, 5 µm or smaller in a case in which the impedance is matched to 30 to 50Ω. In addition, the slits 1218h and 1218i are provided in the portion of the facing portion 1208a which is illustrated in the drawing.

In the waveguide-type optical element 1200 having the above-described constitution, multiple pairs of facets comprising two facets facing each other are formed by the rectangular slits 1216a to 1216k and 1218a to 1218k provided in the facing portion 1206a of the ground electrode 1206 and the facing portion 1208a of the ground electrode 1208 respectively. These pairs of facets respectively function as capacitors. Therefore, similar to the waveguide-type optical element 10 according to the first embodiment, an additional capacity component is added to the characteristic impedance of a distributed constant circuit comprising the central electrode 104 and the ground electrodes 1206 and 1208, and a resonance point is generated in the S21 characteristics of the circuit, whereby broadband operation becomes possible.

Furthermore, in the waveguide-type optical element 1200, the slits 1216a to 1216k and 1218a to 1218k have a narrow slit portion in an opening portion in a region extending a predetermined distance in a direction away from the central electrode 104 from the edges of the facing portions 1206a and 1208a of the ground electrodes 1206 and 1208 close to the central electrode 104, the narrow slit portion having a narrower slit width than other slit portions outside the region. That is, the respective slits 1216a to 1216k and 1218a to 1218k constitute a C-like loop with the respective corresponding back portions 1206b and 1208b behind the slits. These C-like loops respectively function as coils (impedance), and additional impedance component is added to the characteristic impedance of a distributed constant circuit comprising the central electrode 104 and the ground electrodes 1206 and 1208, and thus the transmission velocity of the high-frequency signal that is transmitted through the circuit decreases.

Figure 14:
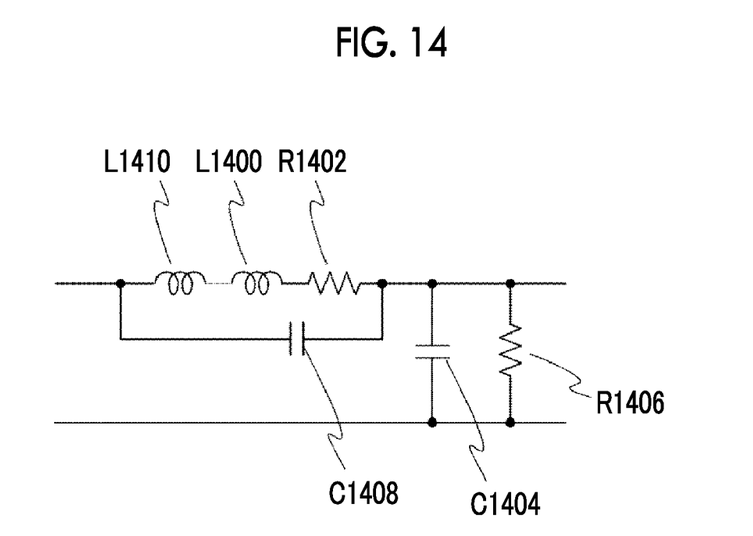
FIG. 14 is an equivalent circuit of a distributed constant circuit comprising a central electrode and ground electrodes in the waveguide-type optical element illustrated in FIG. 12.

FIG. 14 is an equivalent circuit of the distributed constant circuit comprising the central electrode 104 and the ground electrodes 1206 and 1208 in the waveguide-type optical element 1200 illustrated in FIG. 12. L1400 and R1402 are respectively the impedance component and the resistance component of the central electrode 104 and the ground electrodes 1206 and 1208 in a case in which the slits 1216a to 1216k and 1218a to 1218k are not provided. C1404 and R1406 are respectively a capacitance component and a resistance component between the central electrode 104 and the ground electrodes 1206 and 1208. In the waveguide-type element 10 of the present embodiment, since the slits 1216a to 1216k and 1218a to 1218k are provided, the two facing facets constituted by these slits function as capacitors. An additional capacitance C1408 is added to the ground electrodes 1206 and 1208 in parallel.

In addition, the slits 1216a to 1216k and 1218a to 1218k respectively function as coils due to the C-like shape, and additional impedance L1410 is added to the ground electrodes 1206 and 1208 in series. Therefore, as described above, the transmission velocity of the high-frequency signal that is transmitted through the distributed constant circuit comprising the central electrode 104 and the ground electrodes 1206 and 1208 decreases. Therefore, as described above, it is possible to adjust the transmission velocity of the high-frequency signal to be fast by decreasing the thickness of the substrate 100 and also adjust the transmission velocity of the high-frequency signal to be slow by adjusting the shape and dimensions of the ground electrodes (1206 and 1208) so as to balance the above-described increase of the transmission velocity, the degree of freedom in designing the entire waveguide-type optical element improves. Therefore, as described above, the distributed constant circuit comprising the central electrode 104 and the ground electrodes 106 and 108 changes, and thus the broadening of the band of the S21 characteristic becomes possible.

Meanwhile, the slits 1216a to 1216k and 1218a to 1218k are desirably disposed periodically at equal intervals, but may be disposed non-periodically at unequal intervals. In addition, since the above-described electrode constitution does not generate an additional stress in the substrate 100, it is still possible to effectively apply the present invention even in a case in which the thickness of the substrate 100 is set to, for example, 4 μm or smaller in order to match the velocity between an optical wave and the high-frequency signal.

As described above, in the waveguide-type optical elements described in the above-described embodiments 1 to 6 (10 and the like), the slits (116a and the like) or the trenches (816a and the like) are formed in the central electrode (104 and the like) or the ground electrodes (106 and the like) along the transmission direction of the high-frequency signal, whereby multiple pairs of facets comprising two facets facing each other are formed. Since the respective pairs of facets function as capacitors, a resonant point is generated in the S21 characteristic of the distributed constant circuit comprising the central electrode and the ground electrodes, and consequently, the broaderband operation of the waveguide-type optical elements becomes possible.

REFERENCE SIGNS LIST

10, 40, 60, 80, 1000, 1200 . . . waveguide-type optical element, 100 . . . substrate, 102 . . . MZ-type optical waveguide, 104, 1004 . . . central electrode, 106, 108, 406, 408, 606, 608, 806, 808, 1006, 1008, 1206, 1208 . . . ground electrode, 106a, 108a, 406a, 408a, 606a, 608a, 1206a, 1208a . . . facing portion, 106b, 108b, 406b, 408b, 606b, 608b, 1206b, 1208b . . . back portion, 110, 12 . . . parallel waveguide, 116a to 116k, 118a to 118k, 416a to 416k, 418a to 418k, 616a to 616k, 618a to 618k, 1014a to 1014k, 1216a to 1216k, 1218a to 1218k . . . slit, 816a to 816k, 818a to 818k . . . trench.

The invention claimed is:
1. A waveguide-type optical element comprising:
an optical waveguide formed on a substrate having an electro-optic effect; and
a control electrode for controlling an optical wave that is transmitted through the optical waveguide,
wherein the control electrode comprises a central electrode and ground electrodes, the central electrode being formed along the optical waveguide, and the ground electrodes being formed so as to put the central electrode therebetween in a surface direction of the substrate at a predetermined distance from the central electrode conductor,
wherein multiple pairs of facets are formed in the central electrode or the ground electrodes, along a transmission direction of high-frequency signals that are transmitted through the central electrode and the ground electrodes,
wherein each pair of facets comprises two facets which face each other and are orthogonal to the transmission direction, and
wherein the pair of facets has a capacitance which establishes a resonance point in high-frequency transmission characteristics of a distributed constant circuit including the central electrode and the ground electrodes.

2. The waveguide-type optical element according to claim 1,
wherein the multiple pairs of facets are formed periodically at predetermined intervals along the transmission direction of the high-frequency signals.

3. The waveguide-type optical element according to claim 1,
wherein the ground electrode has a front portion that extends toward the central electrode along a longitudinal direction of the central electrode, the front portion being thinner than other portions, and
wherein the multiple pairs of facets are formed in portions other than the front portion having a thinner thickness.

4. The waveguide-type optical element according to claim 2,
wherein the ground electrode has a front portion that extends toward the central electrode along a longitudinal direction of the central electrode, the front portion being thinner than other portions, and
wherein the multiple pairs of facets are formed in portions other than the front portion having a thinner thickness.

5. The waveguide-type optical element according to claim 3,
wherein the multiple pairs of facets are formed as rectangular slits that open in a direction opposite to the central electrode.

6. The waveguide-type optical element according to claim 4,
wherein the multiple pairs of facets are formed as rectangular slits that open in a direction opposite to the central electrode.

7. The waveguide-type optical element according to claim 3,
wherein the multiple pairs of facets are formed as rectangular slits that open in a direction toward the central electrode.

8. The waveguide-type optical element according to claim 4,
wherein the multiple pairs of facets are formed as rectangular slits that open in a direction toward the central electrode.

9. The waveguide-type optical element according to claim 1,
wherein the ground electrode has a front portion that extends toward the central electrode along a longitudinal direction of the central electrode, the front portion being thinner than other portions, and
wherein the multiple pairs of facets are formed in the front portion having a thinner thickness.

10. The waveguide-type optical element according to claim 2,
wherein the ground electrode has a front portion that extends toward the central electrode along a longitudinal direction of the central electrode, the front portion being thinner than other portions, and wherein the multiple pairs of facets are formed in the front portion having a thinner thickness.

11. The waveguide-type optical element according to claim 9,
wherein the multiple pairs of facets are formed as rectangular slits that open in a direction toward the central electrode.

12. The waveguide-type optical element according to claim 10,
wherein the multiple pairs of facets are formed as rectangular slits that open in a direction toward the central electrode.

13. The waveguide-type optical element according to claim 11,
wherein the rectangular slit opening in the direction toward the central electrode has a narrow slit portion in a region extending by a predetermined distance in a direction away from the central electrode from an edge of the ground electrode close to the central electrode, the narrow portion having a narrower slit width than other slit portions outside the region.

14. The waveguide-type optical element according to claim 12,
wherein the rectangular slit opening in the direction toward the central electrode has a narrow slit portion in a region extending by a predetermined distance in a direction away from the central electrode from an edge of the ground electrode close to the central electrode, the narrow portion having a narrower slit width than other slit portions outside the region.

15. The waveguide-type optical element according to claim 1,
wherein the multiple pairs of facets are formed as rectangular holes provided on the top surface of the ground electrode.

16. The waveguide-type optical element according to claim 2,
wherein the multiple pairs of facets are formed as rectangular holes provided on the top surface of the ground electrode.

17. The waveguide-type optical element according to claim 1,
wherein the multiple pairs of facets are formed as slits provided on the top surface of the central electrode.

18. The waveguide-type optical element according to claim 2,
wherein the multiple pairs of facets are formed as slits provided on the top surface of the central electrode.

19. The waveguide-type optical element according to claim 3,
wherein the substrate is made of lithium niobate, and a thickness of the front portion of the ground electrode which is formed to have a thinner thickness is 5 μm or less.

20. The waveguide-type optical element according to claim 4,
wherein the substrate is made of lithium niobate, and a thickness of the front portion of the ground electrode which is formed to have a thinner thickness is 5 μm or less.

21. A waveguide-type optical element comprising:
an optical waveguide formed on a substrate having an electro-optic effect; and
a control electrode for controlling an optical wave that is transmitted through the optical waveguide,
wherein the control electrode comprises a central electrode and ground electrodes, the central electrode being formed along the optical waveguide, and the ground electrodes being formed so as to put the central electrode therebetween in a surface direction of the substrate at a predetermined distance from the central electrode conductor,
wherein multiple pairs of facets are formed in the central electrode or the ground electrodes, along a transmission direction of high-frequency signals that are transmitted through the central electrode and the ground electrodes,
wherein the substrate is made of lithium niobate,
wherein the ground electrode has a front portion that extends toward the central electrode along a longitudinal direction of the central electrode, the front portion being thinner than other portions,
wherein the multiple pairs of facets are formed in the front portion having a thinner thickness, and are formed as rectangular slits that open in a direction toward the central electrode, and
wherein the rectangular slit opening in the direction toward the central electrode has a narrow slit portion in a region extending by a predetermined distance in a direction away from the central electrode from an edge of the ground electrode close to the central electrode, the narrow portion having a narrower slit width than other slit portions outside the region.

22. The waveguide-type optical element according to claim 21,
wherein an inductance component is added to a distributed constant circuit including the central electrode and the ground electrodes by the rectangular slits so that a transmission speed of a signal that is transmitted through the circuit is matched to a speed of light that is transmitted through the optical waveguide.

23. The waveguide-type optical element according to claim 21,
wherein a thickness of the front portion of the ground electrode which is formed to have a thinner thickness is 5 μm or less, and
wherein a thickness of the substrate is 4 μm or less.

* * * * *